Feb. 27, 1968  L. W. BLUEMLE, JR  3,370,710
COMPACT BLOOD DIALYZER WITH A PLEATED MEMBRANE THEREIN
Filed May 11, 1966  3 Sheets-Sheet 1
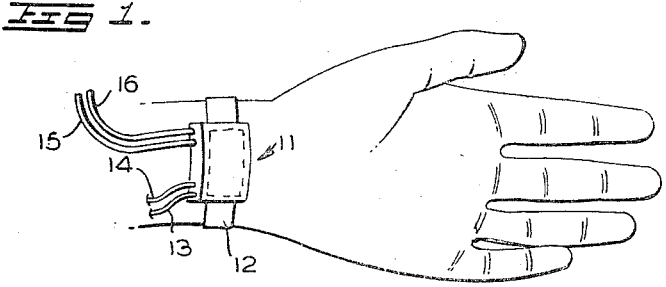
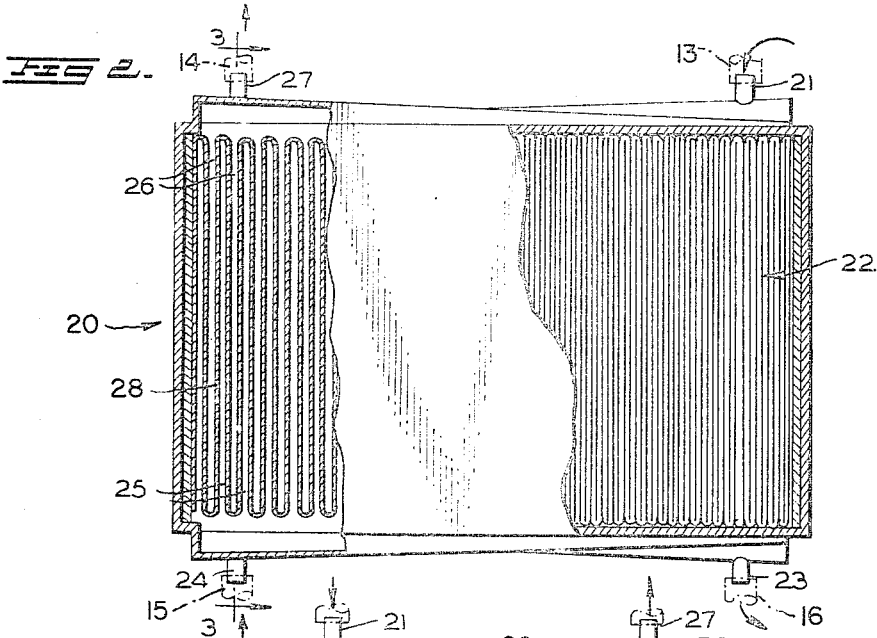
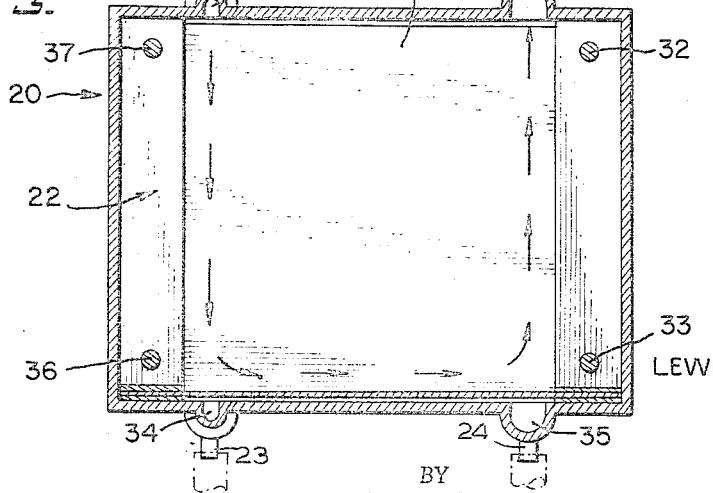
INVENTOR
LEWIS W. BLUEMLE, JR
BY
Stowell & Stowell  ATTORNEYS Feb. 27, 1968  L. W. BLUEMLE, JR  3,370,710
COMPACT BLOOD DIALYZER WITH A PLEATED MEMBRANE THEREIN
Filed May. 11, 1966  3 Sheets-Sheet 2
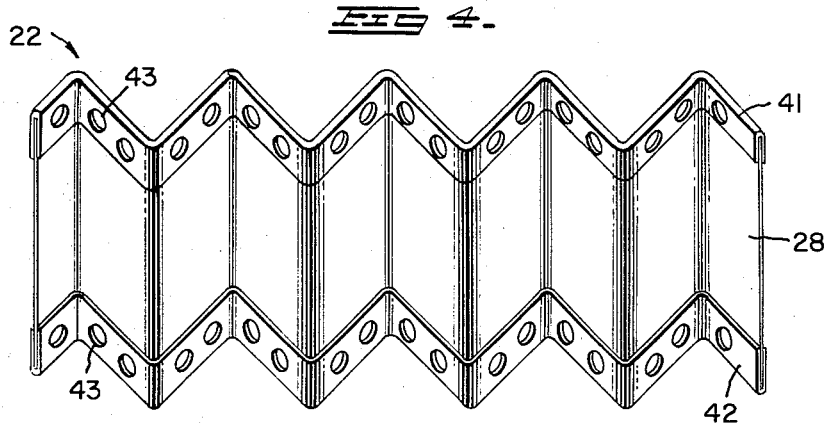
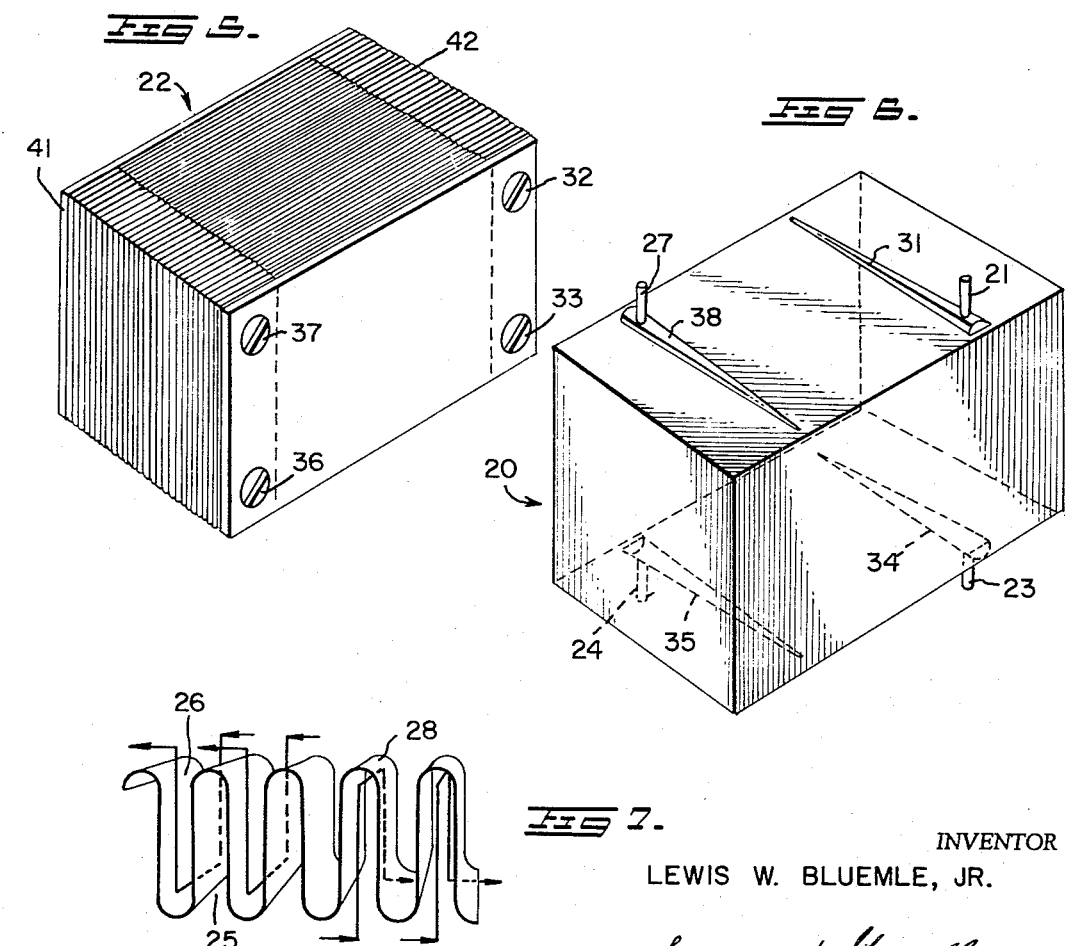
INVENTOR
LEWIS W. BLUEMLE, JR.
BY Stowell & Stowell
ATTORNEYS

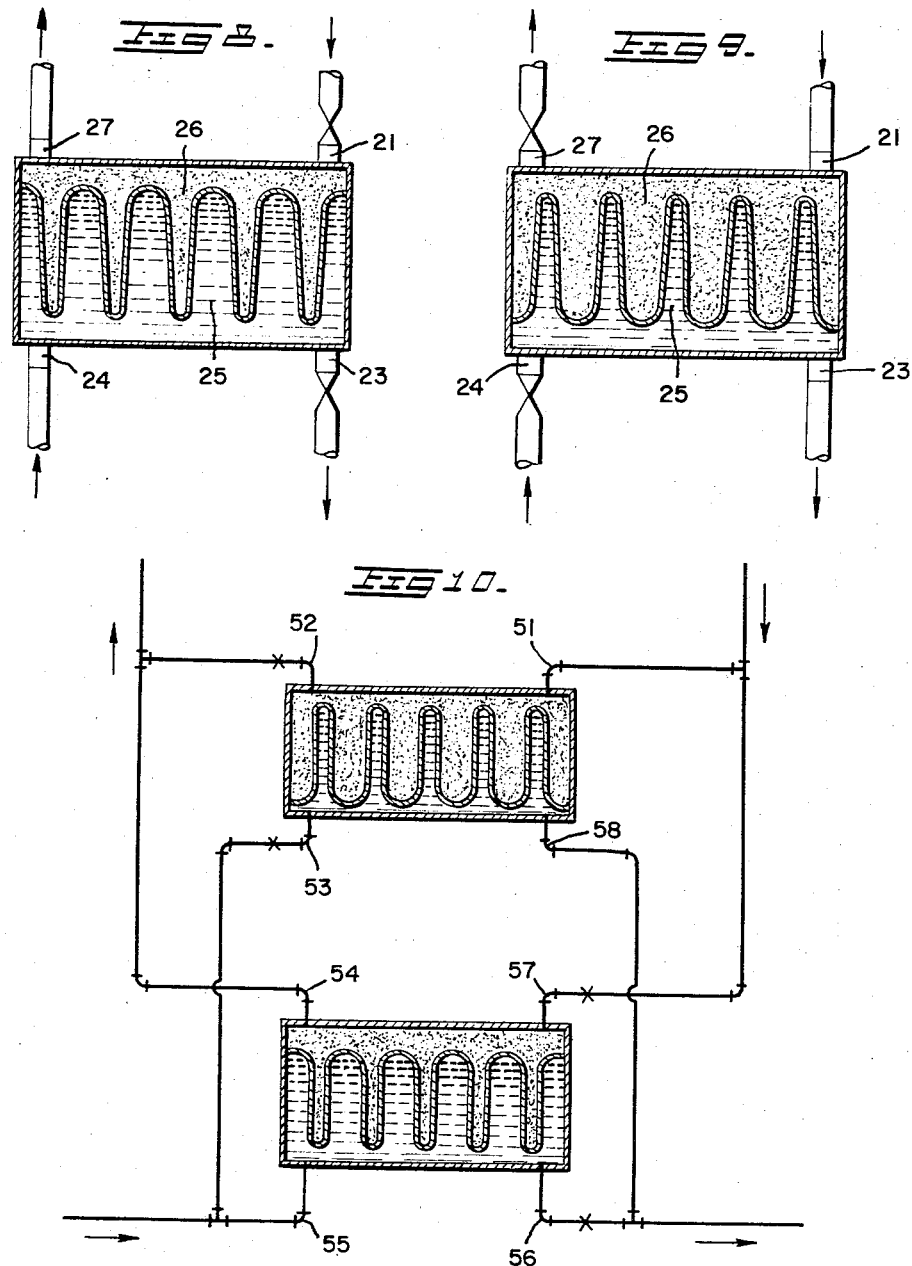

United States Patent Office 3,370,710
Patented Feb. 27, 1968

3,370,710
COMPACT BLOOD DIALYZER WITH A
PLEATED MEMBRANE THEREIN
Lewis W. Bluemle, Jr., Philadelphia, Pa., assignor, by mesne assignments, to Research Corporation, New York, N.Y., a nonprofit corporation of New York
Filed May 11, 1966, Ser. No. 549,224
6 Claims. (Cl. 210—321)

ABSTRACT OF THE DISCLOSURE

A dialysis apparatus comprising a housing, a semi-permeable membrane in the housing, the membrane comprising a compressed pleated tape-like member, first fluid inlet and outlet means in the housing communicating with only one pleated face of the membrane, and second fluid inlet and outlet means in the housing communicating with only the other face of the pleated membrane.

This invention relates to a compact dialysis apparatus. In one specific aspect, it relates to a dialysis apparatus particularly adapted for use in the dialysis of blood. In another more specific aspect, it relates to a dialysis apparatus useful in artificial kidney and artificial lung devices.

An artificial kidney device contains a dialyzer interposed in the blood circulation of a patient whose kidneys are defective or inoperative. Blood circulates through the dialyzer which consists essentially of a semipermeable membrane, usually fabricated of cellulose, separating the blood from a suitable dialysis solution. A saline solution having about the same concentration and proportions of sodium, potassium, chloride, calcium, bicarbonate, magnesium and glucose as in normal plasma is usually employed as the dialysis solution. The solution is adjusted to and maintained at a pH of 7.4 by means of a bicarbonate, acetate and/or other physiologic buffer system; glucose is added to make the solution isotonic with blood. The membrane employed is impermeable to the blood proteins but is permeable to nitrogenous bodily waste products such as urea, uric acid and creatine. These waste products pass from the blood to the dialysis solution across the membrane with a minimum disruption of the other constituents normally present in circulating blood.

An artificial lung device contains a dialyzer interposed in the blood circulation of a patient whose normal respiration has been interrupted, for example, while undergoing heart surgery. Blood circulates through the dialyzer which consists essentially of a semipermeable membrane separating the blood from a suitable oxygen-bearing gas or solution. The membrane is impermeable to liquid but allows carbon dioxide to pass from the blood and oxygen to pass to the blood. When the oxygen source is a gas rather than a solution, membranes fabricated of a plastic such as polytetrafluoroethylene or a silicone rubber are generally employed. The gas is provided under pressure, preferably varying to correspond roughly to the normal respiration cycle.

The rate of removal of waste products including carbon dioxide from the blood depends on the membrane surface area in contact with both the blood and the solution or gas on the other side of the membrane. In order to provide the large surface area of membrane per unit volume, particularly desirable in hemodialyzers, prior art dialyzers have wound the membrane in a generally spiral configuration or have employed membrane stacks with separators inserted between the membrane tubes or sheets.

I have discovered that large membrane surface areas per unit volume can be provided by eliminating the space consuming membrane spacers and disposing the membrane in the form of compact accordion-like pleats. The high surface area of membrane and flow path of blood relative to the saline solution within the membrane folds obtained by pleating gives rise to a highly efficient yet compact dialysis unit.

It is, therefore, an object of the present invention to provide a compact dialyzer apparatus particularly suitable for use in artificial kidney and artificial lung devices.

It is another object of the invention to provide such apparatus having a large surface area of membrane between the blood and dialysis solution or oxygen source so that efficient separation of the waste products from the blood can be achieved utilizing only a relatively small quantity of the total blood circulation within the dialyzer unit at any given time.

It is a further object of the present invention to provide a compact hemodialyzer suitable for use by an ambulatory patient.

These and other objectives and advantages of the present invention will become apparent on consideration of the dialysis apparatus more fully described in the following discussion and accompanying drawings, wherein:

FIG. 1 illustrates one form of the apparatus of the invention applied to the arm of a patient;

FIG. 2 is an enlarged elevational view of the apparatus with portions broken away in two planes to illustrate the internal features of the apparatus;

FIG. 3 is a vertical sectional view along line 3—3 of FIG. 2;

FIG. 4 is a fragmentary expanded view of the accordion-like membrane used in the apparatus illustrated in FIGS. 1, 2, and 3;

FIG. 5 is a perspective view of the accordion-like membrane element in compressed form for insertion into the housing;

FIG. 6 is a perspective view of the housing;

FIG. 7 is a schematic view of the fluid paths within the accordion-like membrane;

FIG. 8 is a schematic view of the apparatus of the invention in the blood emptying phase;

FIG. 9 is a schematic view similar to FIG. 8 but in the blood filling phase; and FIG. 10 is a schematic view employing a double dialyzer apparatus of the invention.

The present invention is a dialysis apparatus comprising a housing, a semipermeable membrane in said housing, said membrane comprising a compressed pleated tape-like member, first fluid inlet and outlet means in said housing communicating with only one pleated face of the membrane, and second fluid inlet and outlet means in said housing communicating with only the other face of the pleated membrane.

Referring now to the drawings in more detail, FIG. 1 illustrates the dialysis apparatus of the present invention in use as an artificial kidney device. The dialysis apparatus generally designated 11 is attached by means of band 12 to the underside of the wrist of a patient. Tubes 13 and 14 conduct blood from an artery to the apparatus and return the dialyzed blood to a vein. Tubes 15 and 16 conduct the dialysis fluid to the dialyzer unit and return it to the storage unit for the dialysis fluid (not shown). In the case of an ambulatory patient, the storage unit and means for driving the dialysis fluid would be located under the clothing of the patient as inconspicuously as possible.

FIG. 2 is a view of the dialysis apparatus with portions of a side and the top broken away. The apparatus comprises a housing generally designated as 20 and an accordion-like, pleated membrane generally designated as 22. The dialyzing surface of the membrane 28 has two faces 26 and 25, wetted by the first fluid and the second fluid, respectively. The membrane unit as a whole is in fluid-tight relationship to the sides of a housing so as to prevent fluid flow around the edges of the unit. The entire apparatus is arranged so that there is no fluid connection between the two faces and so that there are two separate fluid paths through the dialyzer apparatus. The apparatus is provided at its upper membrane face 26 with a port 21 for the entrance of the first fluid and a port 27 diagonally across the side of the housing from port 21 for the removal of that fluid from the apparatus. At the lower membrane face 25, port 24 is provided for the entrance of the second fluid and port 23 diagonally across the side of the housing from port 24 for the removal of the second fluid from the apparatus.

When the dialysis apparatus of FIG. 2 is employed in an artificial kidney device, the membrane is usually made of a cellulosic material such as cellophane, the first fluid is blood, and the second fluid is a saline dialysis solution. When the apparatus is employed in an artificial lung device, the membrane is usually made of an elastomeric plastic material such as silicone rubber inert or highly resistance to action of the first fluid and the second fluids. In the lung device, the first fluid is blood but the second fluid is an oxygen-containing fluid with the oxygen provided as a suitable gas mixture.

Referring to FIG. 3 the first fluid is shown to flow through each fold or pleat of the membrane opening upwardly in a downward, crosswise and finally upward direction within the fold as indicated by the arrows. The relative location of the inlet and outlet ports 21, 23, 24 and 27, the method of fluid distribution and removal via grooves 31, 34, 35 and 38, and the narrow spacings between adjacent membrane folds tend to promote such a path for fluid flow. A similar but opposite liquid flow path is obtained for the second fluid in each fold opening downwardly.

FIG. 4 shows a portion of the pleated membrane 22, fabricated from a long ribbon or tape, expanded to illustrate construction of the membrane. The upper and lower edges of the membrane are reinforced by having reinforcing strips 41 and 42 attached to both edges of the membrane. Holes 43 are provided in the reinforced edges for the insertion of tie rods or bolts.

FIG. 5 shows the accordion-like, pleated membrane unit in compressed form for insertion into the dialysis apparatus housing. The membrane unit is compressed by means of bolts 32, 33, 36 and 37, through the reinforced edges 41 and 42. Each edge is reinforced by means of a reinforcing strip attached to one or both sides of the membrane.

FIG. 6 better illustrates the preferred method of locating the inlet and outlet ports to provide for countercurrent flow of the first and second fluids within the dialysis apparatus. The first fluid enters via inlet port 21 and is distributed via tapering groove 31. Outgoing first fluid is collected in groove 38 and withdrawn through outlet port 27. Grooves 31 and 38 are positioned transversely to the parallel, upwardly opening, fluid channels of membrane face 26. Similarly located inlet port 24 and tapered groove 35, and tapered collection groove 34 and outlet port 33 are located in communication with membrane face 25 to provide for circulation of the second fluid to the downwardly opening fluid channels.

FIG. 7 shows the two fluid paths within and between interdigitating parallel folds of the pleated membrane. The first fluid from the upper distribution groove divides and enters from above and passes downwardly, transversely and finally upwardly in individual upwardly opening folds of the membrane and passes to the return groove. The second fluid travels a similar but reverse path in the individual downwardly opening folds of the membrane. The second fluid enters from below in a direction opposite to that of the first fluid, passes upwardly and transversely and finally downwardly before passage to the return groove. The resultant overally flow of the second fluid is countercurrent to that of the first fluid. The spaces bounded by the upper and lower membrane folds interdigitate in close packed reltaionship to provide efficient contact via the membrane between the two fluids.

FIGS. 8 and 9 illustrate sequential cycles of the operation of the dialysis apparatus of the present invention as an artificial kidney device. In FIG. 8, dialysis fluid under pressure enters at port 24. The accumulation of dialysis fluid in membrane face 25 under a pressure larger than that of the blood on the other side of the membrane causes the membrane to move and expel blood in membrane face 26 from the dialyzer and force it back to the patient's venous system via blood outlet port 27. Blood entrance port 21 and dialysis solution exit port 23 are closed by means of valves. As shown, the folds containing the dialysis fluid are distended and aid in squeezing blood out of the alternate interdigitating folds. Only a small force is required to return blood to the relatively low-pressure venous circulation.

FIG. 9 shows the same unit as in FIG. 8 but with the two valves shown open in FIG. 8 now closed, and the two valves shown closed in FIG. 8 now open. These valves can either be externally actuated or activated by pressure differentials effected by changing the pressure in the dialyzer fluid compartment. As shown, arterial blood enters via inlet port 21 and dialysis solution exits via outlet port 23. Blood outlet tube 27 and dialysis solution inlet tube 24 are closed by means of valves. In this situation, the pressure in the upper or blood compartment is greater than the pressure in the lower or dialysis fluid compartment. The folds containing blood under arterial pressure in membrane face 26 are distended and aid in squeezing dialysis fluid out of the alternate interdigitating folds of membrane face 25.

FIG. 10 illustrates the use of two dialysis units in parallel. This arrangement allows for the more continuous operation of the kidney device by providing for the continuous feeding and removal of blood and dialysis fluid from the artificial kidney device. Continuous operation is obtained by having one unit in the blood emptying phase while the other corresponding unit is in the blood filling phase. While arterial blood is entering the upper unit at its right-hand side through inlet valve 51, treated blood is being returned to the venous system for venous circulation from the upper left-hand corner of the lower unit via outlet port 54. At the same time, dialysis fluid is being supplied to the device at the lower left-hand corner of the lower unit via inlet valve 55, and exposed dialysis fluid is being removed from the lower right-hand corner of the upper unit via outlet valve 58. During this portion of the cycle blood outlet valve 52, blood inlet valve 57, dialysis fluid inlet valve 53 and dialysis fluid outlet valve 56 are closed.

An external control is provided which periodically shunts the blood and dialysis fluid flow to each unit by alternating the valve positions. For example, operation of this control would simultaneously close blood inlet valve 51 and open blood inlet valve 57, close blood outlet valve 54 and open blood outlet valve 52, open dialysis fluid inlet valve 53 and close dialysis solution inlet valve 55, and close dialysis fluid outlet valve 58 and open dialysis fluid outlet valve 56.

A dialysis apparatus according to the present invention was constructed using pleated cellophane tape reinforced at each edge by means of paper strips 0.0178 cm. thick to provide a means spacing between membrane folds of 0.0356 cm. The accordion-like pleated membrane provided 7700 cm.$^2$ of membrane surface area in a container having internal dimensions of 5 x 5 x 7 cm. or a total internal volume of 175 cm.$^3$. More compact models were obtained by using paper tapes on only one side of the membrane or by eliminating the paper tapes altogether. In the latter case, the outer edges of the membrane were folded longitudinally to form thin hems to act as reinforcements for securing the membrane edges. It was then possible to pack the 7700 cm.$^2$ surface area membrane into a housing having internal dimensions of only 2 x 4 x 5 cm. or an internal volume of 40 cm.$^3$. Runs were made using cellophane as the membrane material and sodium chloride as the solute being transferred. Using a flow-rate of 180 ml. per minute, dialysance reached 38 ml. per minute. At the more readily achievable flow-rate of 90 ml. per minute, the dialysance was 33 ml. per minute and clearance was 25 ml. per minute. Clearance is defined as the rate of removal of a given solute from blood divided by the inlet blood concentration of that solute.

Certain preferred embodiments of the present invention have been disclosed for the purpose of illustrating the invention. It is evident that various changes and modifications may be made without departing from the scope and the spirit of the present invention. The invention is as described in the appended claims.

I claim:
1. A dialysis apparatus comprising a housing, a semipermeable membrane in said housing, said membrane comprising a compressed pleated tape-like member having its ends and edge portions in fluid-type sealed relationship to the housing, first fluid inlet and outlet means in said housing communicating with only one pleated face of the membrane, and second fluid inlet and outlet means in said housing communicating with only the other face of the pleated membrane.

2. A hemodialysis apparatus comprising a housing; a semipermeable membrane comprising a compressed pleated tape reinforced at each edge and having its end and edge portions in fluid-tight relationship to four sides of the housing, the open spaces between the folds of the pleated tape forming two fluid-type sections within the housing; and independent fluid inlet and outlet means in the side of the housing corresponding to each of the two sections.

3. An apparatus according ot claim 2 wherein each outlet means is located diagonally across the side of the housing from the corresponding inlet means.

4. An apparatus according to claim 3 wherein the inlet means are located diagonally across the housing from each other.

5. An artificial kidney device comprising a housing; a semipermeable membrane comprising a compressed pleated cellophane tape having a reinforcing strip attached at each edge and having its ends and edge portions in fluid-tight relationship to four sides of the housing, the open spaces between the folds of the pleated tape forming two fluid-tight sections within the housing; independent fluid inlet and outlet portions in the sides of the housing corresponding to each of the two sections, the inlet ports being located diagonally across the side of the housing from the corresponding outlet ports; tubing connecting one set of inlet and outlet ports to sources of arterial and venous blood, respectively; and tubing connecting one set of inlet and outlet ports to a source of dialysis solution.

6. An artificial lung device comprising a housing; a semipermeable membrane comprising a compressed pleated plastic tape having a reinforcing strip attached at each edge and having its end and edge portions in fluid-tight relationship to four sides of the housing, the open spaces between the folds of the pleated tape forming two fluid-tight sections within the housing; independent fluid and gas inlet and outlet ports in the sides of the housing corresponding to each of the two sections, the inlet and outlet ports being located diagonally across the side of the housing for the corresponding outlet ports; tubing connecting one set of inlet and outlet ports to sources of arterial and venous blood, respectively; and tubing connecting the other inlet port to a source of oxygen.

References Cited

UNITED STATES PATENTS

| | | | |
|---|---|---|---|
| 3,258,900 | 7/1966 | Harms | 210—493 |
| 3,266,223 | 8/1966 | Dresser et al. | 55—158 |

FOREIGN PATENTS

| | | |
|---|---|---|
| 1,096,554 | 1/1961 | Germany. |

OTHER REFERENCES

Bluemle et al.: "A Compact Blood Dialyzer Without Membrane Supports: Design and Fabrication," Transactions of the American Society for Artificial Internal Organs. Held April 9 and 10, 1965, Atlantic City, N.J., vol. XI, pages 157–160. Copies may be ordered from Dr. George E. Schreiner, Dept. of Medicine, Georgetown University Hospital, Washington, D.C.

REUBEN FRIEDMAN, *Primary Examiner.*

F. SPEAR, *Assistant Examiner.*